(12) United States Patent
Chiang

(10) Patent No.: US 7,779,719 B2
(45) Date of Patent: Aug. 24, 2010

(54) COMBINATION OF DERAILLEUR SHIFTER AND BRAKE LEVER

(75) Inventor: Douglas Chiang, Ta-Li (TW)

(73) Assignee: Hsiu-Chih Wang, Taichung Hsien (TW)

( * ) Notice: Subject to any disclaimer, the term of this patent is extended or adjusted under 35 U.S.C. 154(b) by 903 days.

(21) Appl. No.: 11/602,962

(22) Filed: Nov. 22, 2006

(65) Prior Publication Data
US 2008/0115616 A1    May 22, 2008

(51) Int. Cl.
*F16C 1/10* (2006.01)
*G05G 11/00* (2006.01)
*G05G 13/00* (2006.01)
*B62K 25/02* (2006.01)

(52) U.S. Cl. ............... 74/502.2; 74/488; 74/489; 74/473.14; 74/473.15

(58) Field of Classification Search ............... 74/502.2, 74/488, 489, 473.14, 473.15, 501.6; 192/217; B62L 3/02
See application file for complete search history.

(56) References Cited

U.S. PATENT DOCUMENTS

| | | | | |
|---|---|---|---|---|
| 2,924,115 A | * | 2/1960 | Hood ............... | 74/489 |
| 6,095,309 A | * | 8/2000 | Mione ............... | 192/217 |
| 7,219,574 B2 | * | 5/2007 | Ichida et al. ......... | 74/502.2 |
| 7,412,867 B2 | * | 8/2008 | Boulin ............... | 72/389.9 |
| 7,526,979 B2 | * | 5/2009 | Tsumiyama .......... | 74/502.2 |
| 2002/0035886 A1 | * | 3/2002 | Ose ................... | 74/502.2 |
| 2007/0137390 A1 | * | 6/2007 | Dal Pra' et al. ...... | 74/502.2 |

FOREIGN PATENT DOCUMENTS

JP    11-34961    * 2/1999

OTHER PUBLICATIONS

English Abstract of JP 11-34961, Chiba Hiroyuki, Feb. 9, 1999.*

* cited by examiner

*Primary Examiner*—Vinh T. Luong

(57) ABSTRACT

A combination of derailleur shifter and brake lever for bicycles includes a lever which can be pivoted relative to the handlebar so as to respectively control the braking mechanism and the derailleur gears. The lever has a rod connected thereto which controls a driving pawl unit which allows the rider to operate the rack of a driving unit to pull or release the derailleur cable.

7 Claims, 12 Drawing Sheets

US 7,779,719 B2

COMBINATION OF DERAILLEUR SHIFTER AND BRAKE LEVER

FIELD OF THE INVENTION

The present invention relates to a combination of a derailleur shifter and a brake lever for bicycles, the rider operates the lever to respective control the braking mechanism and the derailleur gears.

BACKGROUND OF THE INVENTION

A conventional bicycle brake lever is connected to each of two ends of the handlebar so as to control the brake mechanism of the front and rear wheels. For a bicycle with derailleur system, two shifters are also connected to the handlebar so as to control the derailleur cables for engaging the front and rear gears. The break levers and the shifters are separately installed so that the rider has to move his/her hands from one to another when operating the shifter and the break lever. The separate shifters and brake levers not only increase the complexity of installation, but also increase the potential risk of accident.

The present invention intends to provide a combination of derailleur shifter and brake lever for bicycles so that the rider can operate the braking action and the gearing on the same lever at different directions.

SUMMARY OF THE INVENTION

The present invention relates to a combination of derailleur shifter and brake lever for bicycles, and the combination comprises a base connected to a bicycle handlebar and an end member is pivotably connected to a distal end of the base. A lever has a first end pivotably connected to the end member by a pivot and a toothed portion is defined in the first end of the lever so as to be connected with a driving unit in the base. A rod is connected to the lever and has a protrusion which is located close to a second end of the lever. A first block and a second block extend radially from the rod with an angle defined therebetween so that when the rider pushes the protrusion, the first and second blocks are rotated an angle with the rod 31.

The driving unit includes a driving plate, a rack and a driving pawl unit. The driving plate is movably connected to a first guide rod includes a plurality of teeth extending from on a side thereof. The toothed portion is engaged with the teeth. Two positioning members are connected to the other side of the driving plate and each positioning member has an inclined engaging end. The rack is movably connected to a second guide rod and has a plurality of notches with which the inclined engaging ends of the positioning members are removably engaged. The rack further has a plurality of first engaging recesses and second engaging recesses. A derailleur cable has an end fixed to the rack.

The driving pawl unit has a first pawl and a driving member, wherein the first pawl includes a first piece and a hooked piece which has one end fixed with one end of the first piece. The hooked piece is removably engaged with first recesses and the driving member has a hooked end which is removably engaged with the second engaging recesses. The first block on the rod is located in contact with a first side of the first piece and the second block is located in contact with the first pawl. By rotating the rod, the driving pawl unit is disengaged from the rack which is then can be pulled by operating the lever to control the derailleur cable.

The primary object of the present invention is to provide a lever that can be used as a conventional brake lever and a derailleur shifter by operating a rod attached on the lever.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2-1 shows the rack from the other side thereof;

DETAILED DESCRIPTION OF THE PREFERRED EMBODIMENT

Figure 1:
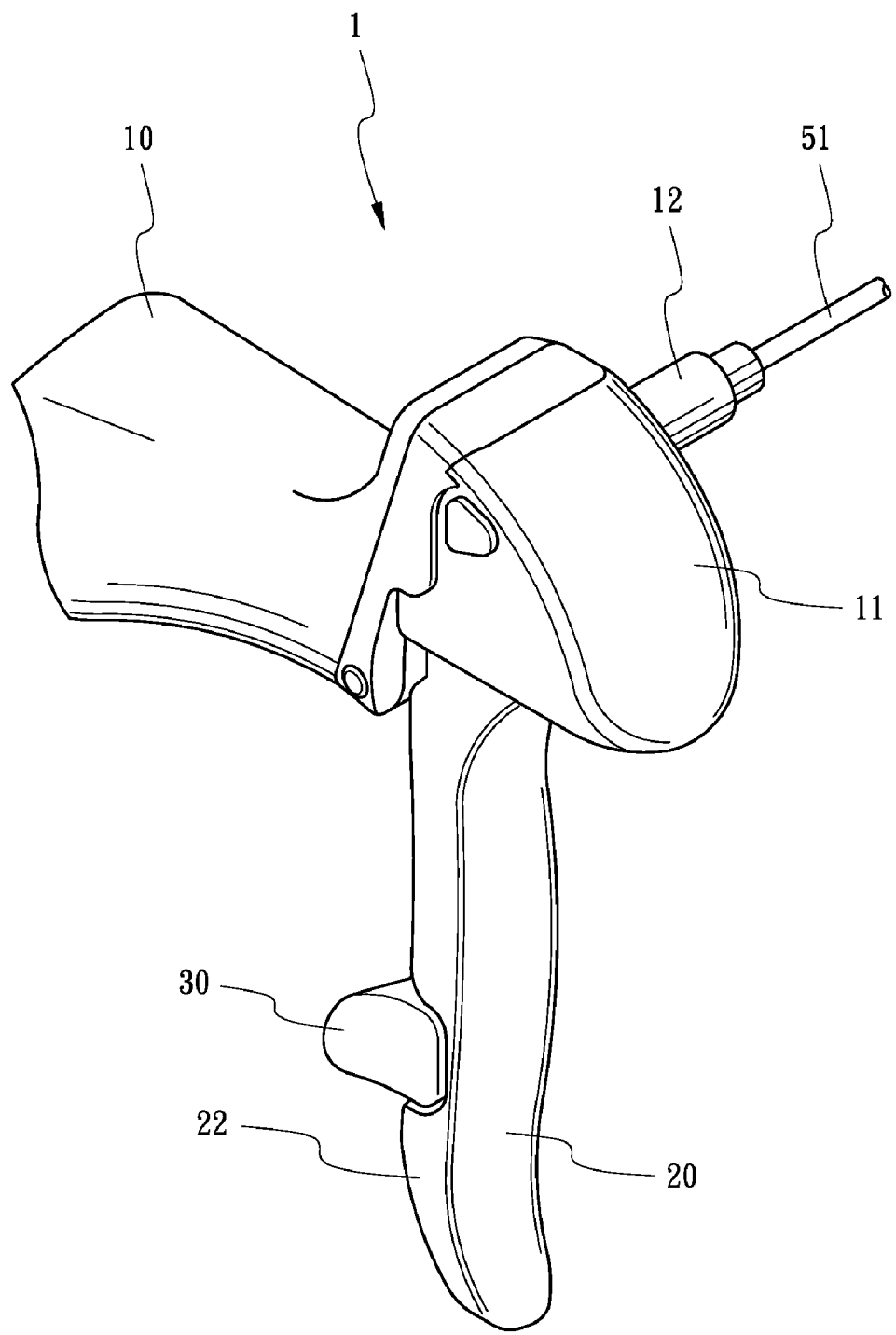
FIG. 1 is a perspective view to show the combination lever of the present invention.

Referring to FIGS. 1 to 4, the combination lever 1 for bicycles of the present invention comprises a base 10 connected to each of two ends of a bicycle handlebar 50 and an end member 11 is pivotably connected to a distal end of the base 10. A lever 20 has a first end 21 pivotably connected to the end member 11 by a pivot 23 and a toothed portion 24 is defined in the first end 21 of the lever 20. The pivot 23 has a first torsion spring 231 mounted thereto so that when releasing the lever 20, the lever returns to its original position.

A rod 31 is connected to the lever 20 in parallel with the lever 20 and has a protrusion 30 which is located close to a second end 22 of the lever 20 so that the rider can conveniently operate the protrusion 30. A first block 312 and a second block 313 extend radially from the rod 31, and an angle defined between the first and second blocks 312, 313. A second torsion spring 231 is mounted to the rod 31 so that the rod 31 returns to its original position when being released.

Figure 2:
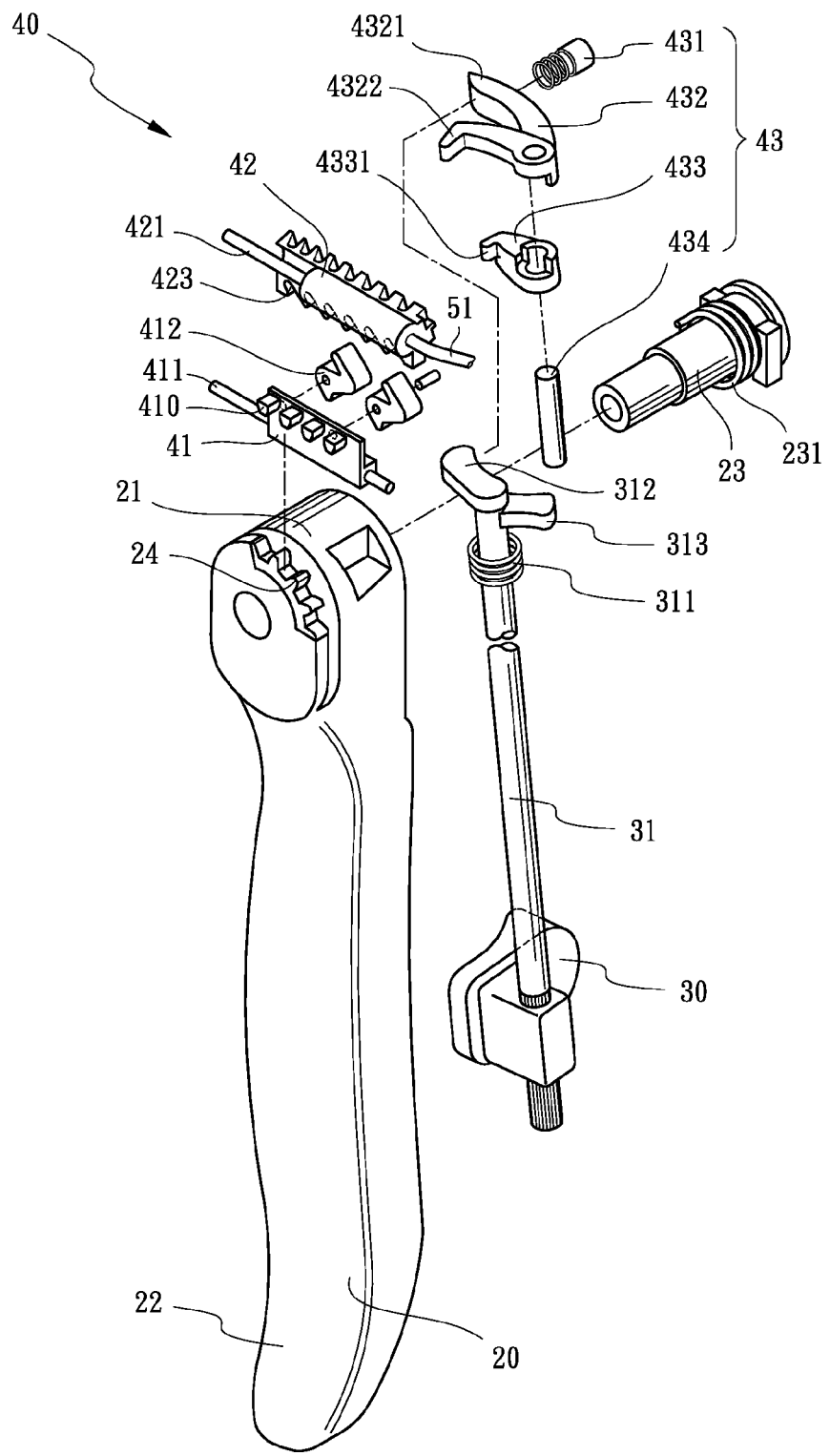
FIG. 2 is an exploded view to show the combination lever of the present invention.
Figures 1, 2:
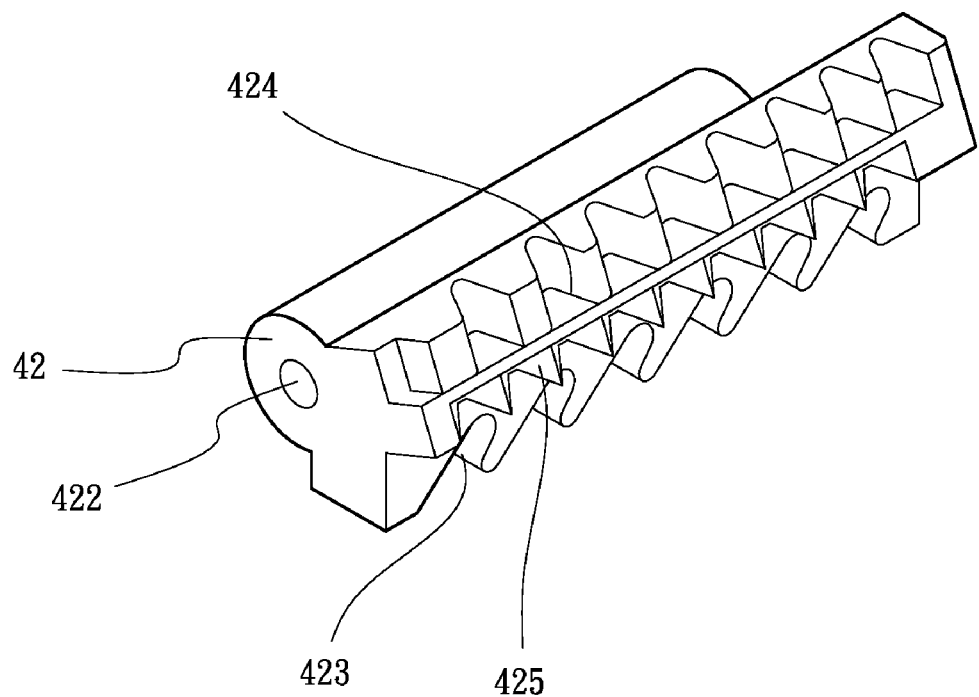
Figure 3:
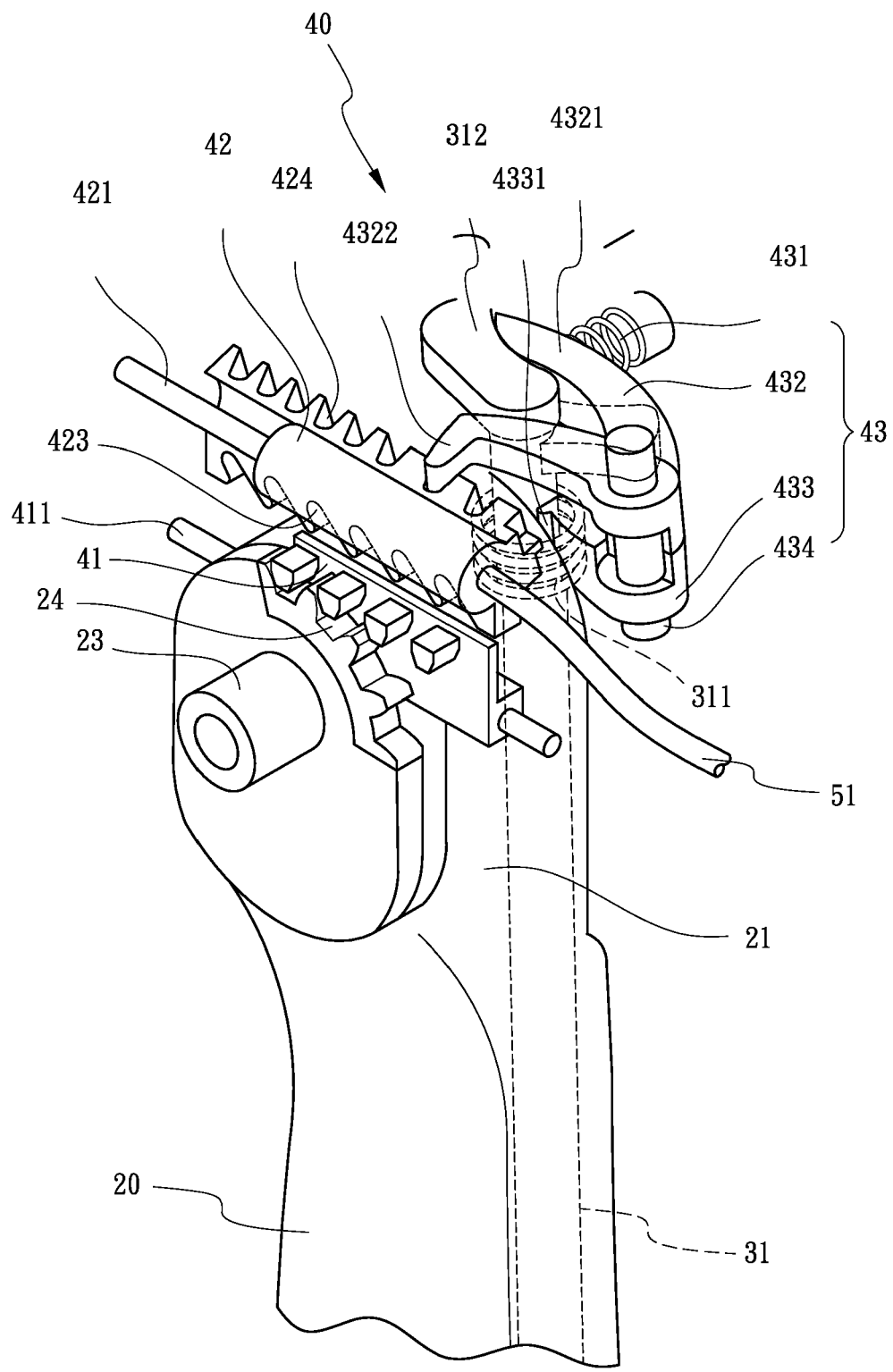
FIG. 3 shows the connection of the driving unit, the lever and the rod of the combination lever of the present invention.
Figure 4:
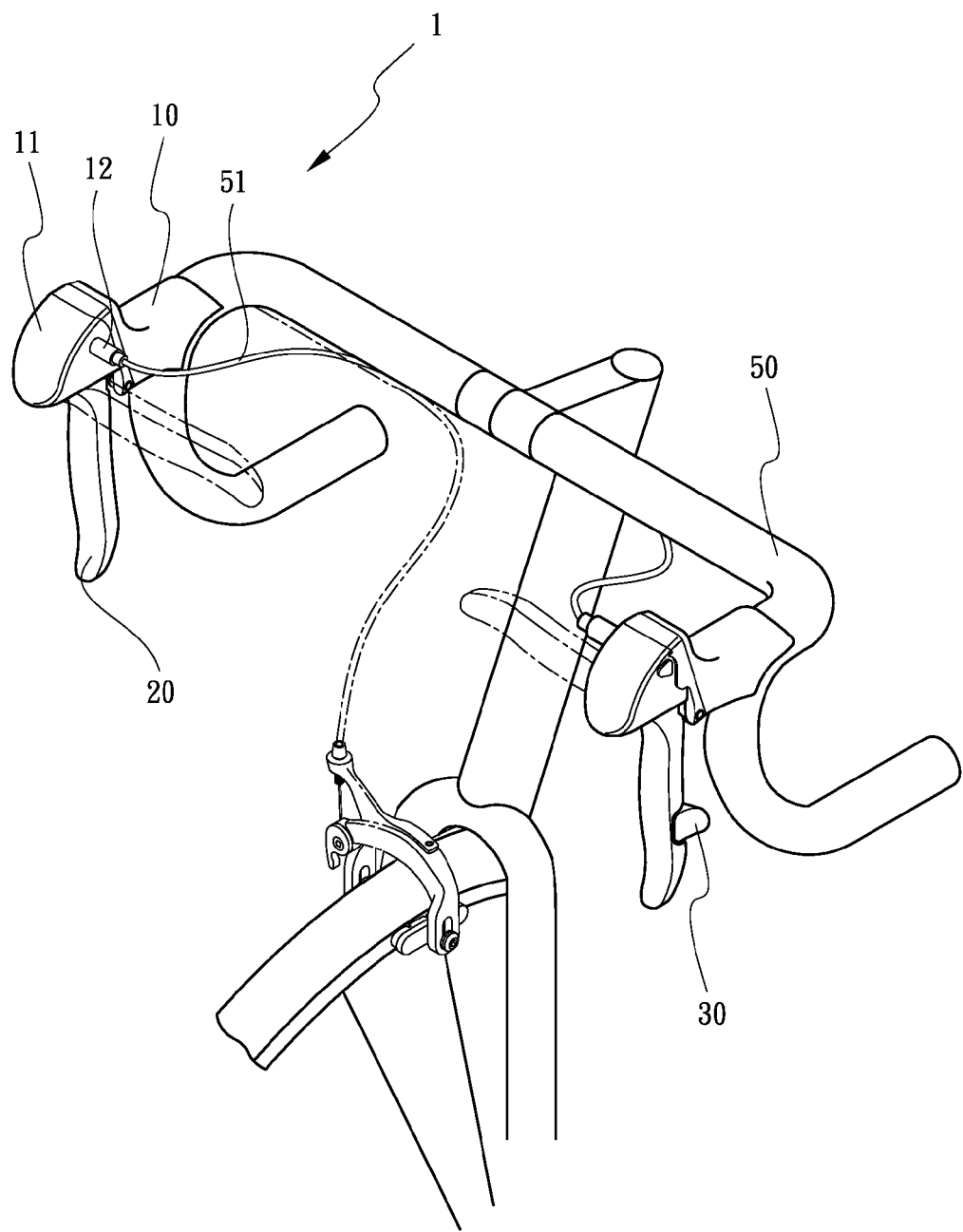
FIG. 4 is a perspective view to show that the combination lever is pivoted to operate the derailleur cables.

Further referring to FIG. 2-1, a driving unit 40 is located in the base 10 and includes a driving plate 41, a rack 42 and a driving pawl unit 43. The driving plate 41 is movably connected to a first guide rod 411 and a plurality of teeth 410 extend from on a side of the driving plate 41. The toothed portion 24 is engaged with the teeth 410. Two Z-shaped positioning members 412 are pivotably connected to the other side of the driving plate 41 and each positioning member 412 has an inclined engaging end.

The rack 42 is movably connected to a second guide rod 421 and has a plurality of notches 423 with which the inclined engaging ends of the positioning members 412 are removably engaged. The second guide rod 421 is located at a first end of the rack 42 and a fixing recess 422 is defined in a second end of the rack 42. A first end of the derailleur cable 51 is fixedly engaged with the fixing recess 422 and a second end of the derailleur cable 51 extends through a tube 1212 extending from the base 10. The rack 42 further has a plurality of first engaging recesses 424 and second engaging recesses 425.

The driving pawl unit 43 includes a first pawl 432 and a driving member 433, a pin 434 extends through the first pawl 432 and the driving member 433. The first pawl 432 includes a first piece 4321 and a hooked piece 4322 which has one end fixed with one end of the first piece 4321. The hooked piece 4322 is removably engaged with first recesses 424. The driving member 433 has a hooked end 4331 which is removably engaged with the second engaging recesses 425. The first block 312 on the rod 31 is located in contact with a first side of the first piece 4321 and the second block 313 located in contact with the first pawl 433. A biasing member 431 is located between an inside of the base 10 and a second side of the first piece 4321.

Figure 5:
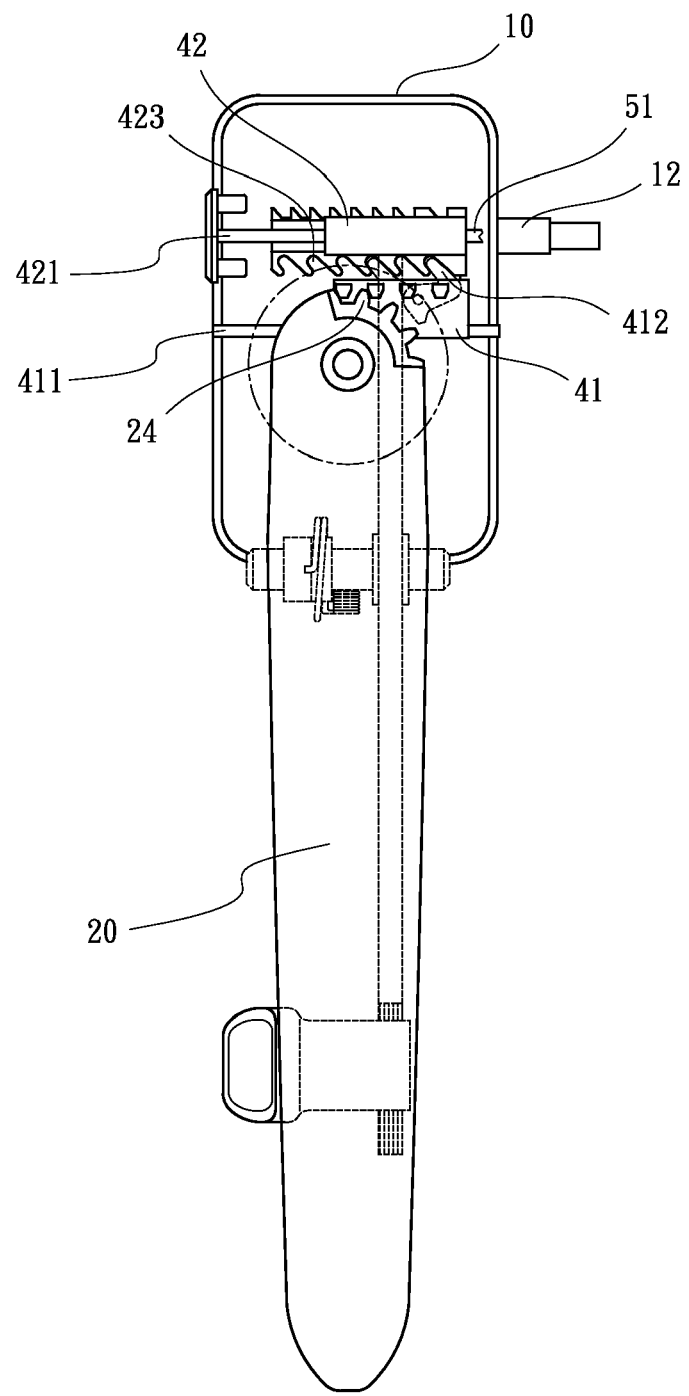
FIG. 5 shows that the combination lever has not yet pivoted.
Figure 6:
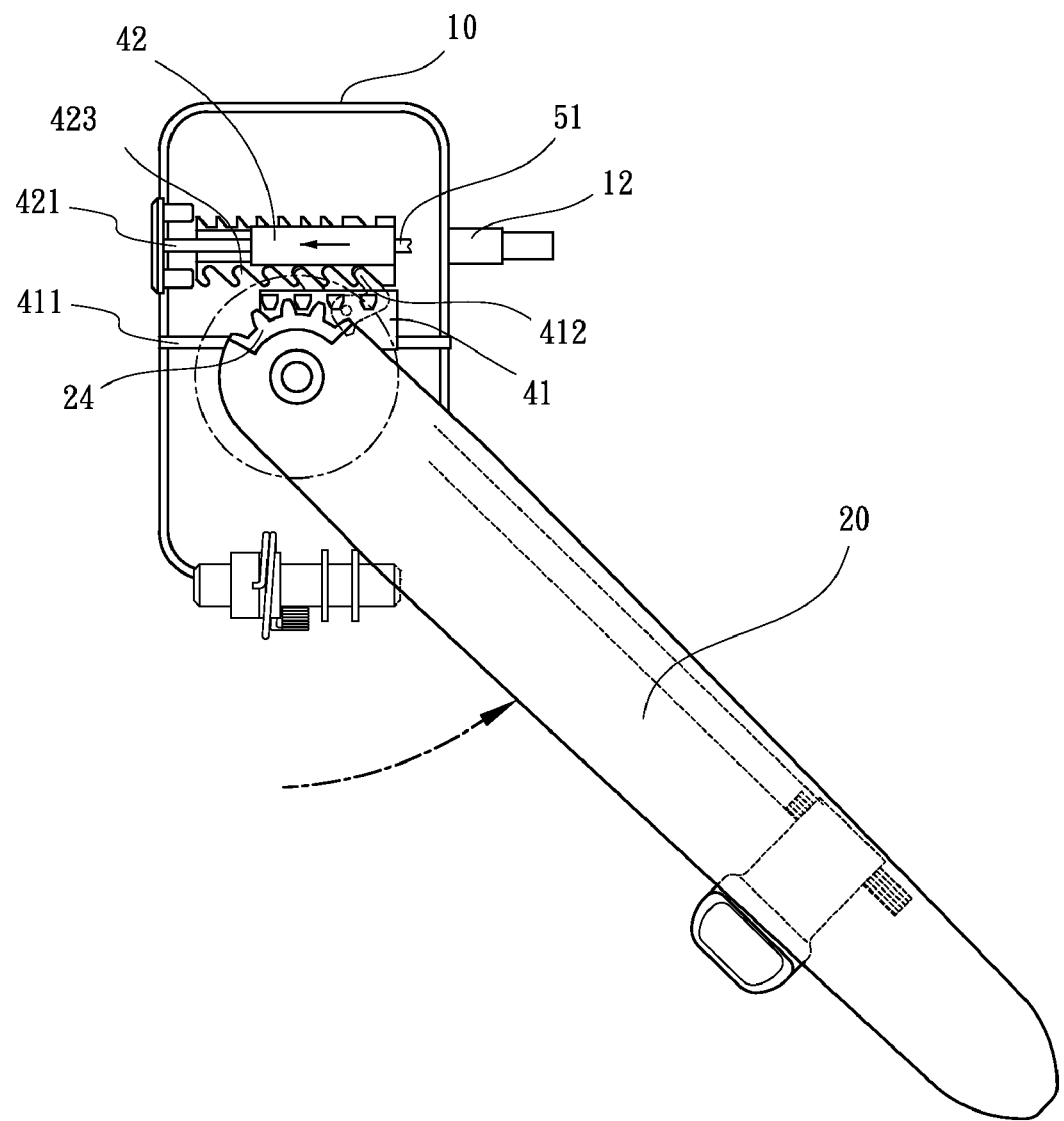
FIG. 6 shows that the combination lever is pivoted and the rack is moved.
Figure 7:
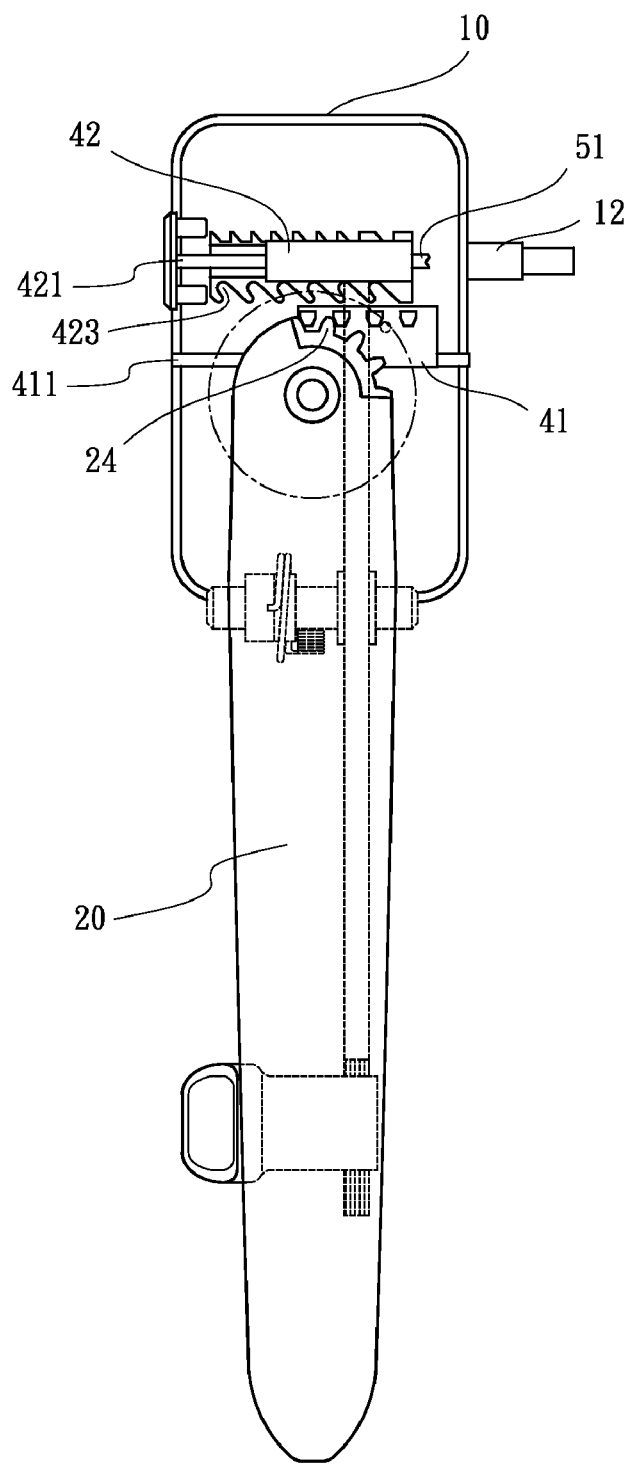
FIG. 7 shows that the combination lever returns to its original position when being released.

As shown in FIGS. 5 and 6, when the rider pivots the lever 20 to drive the driving plate 41, the positioning members 412 on the driving plate 41 then move the rack 42 so that the derailleur cable 51 is pulled together with the rack 42. When the lever 20 is released, the lever 20 returns to its original position by the first torsion spring 231 as shown in FIG. 7. The positioning members 412 are engaged with the notches 423, and the rack 42 is not moved with the return of the lever 20 so that the derailleur cable 51 is maintained its position.

Figure 8:
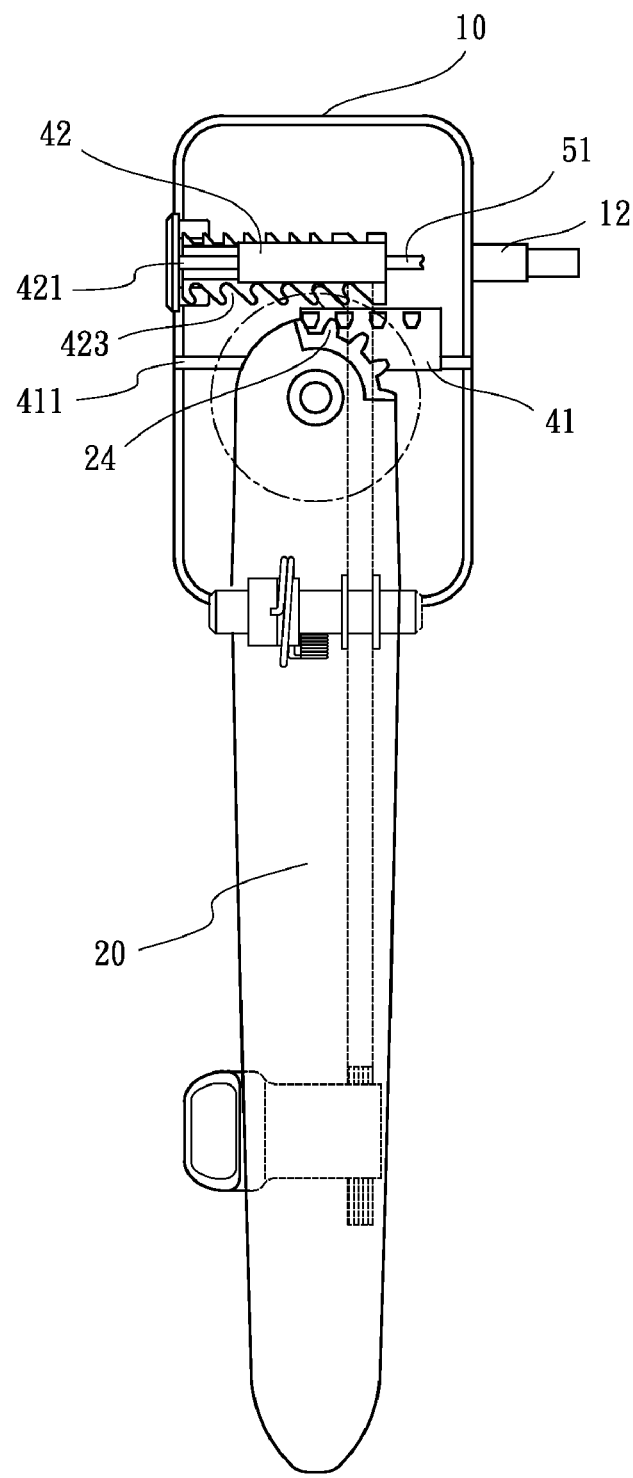
FIG. 8 shows that the rack is moved to contact an inside of the base.

As shown in FIG. 8, when the lever 20 is operated several times, the rack 42 moves to a position to contact an inside of the base 10, the rack 42 cannot be moved further in the same direction.

Figure 9:
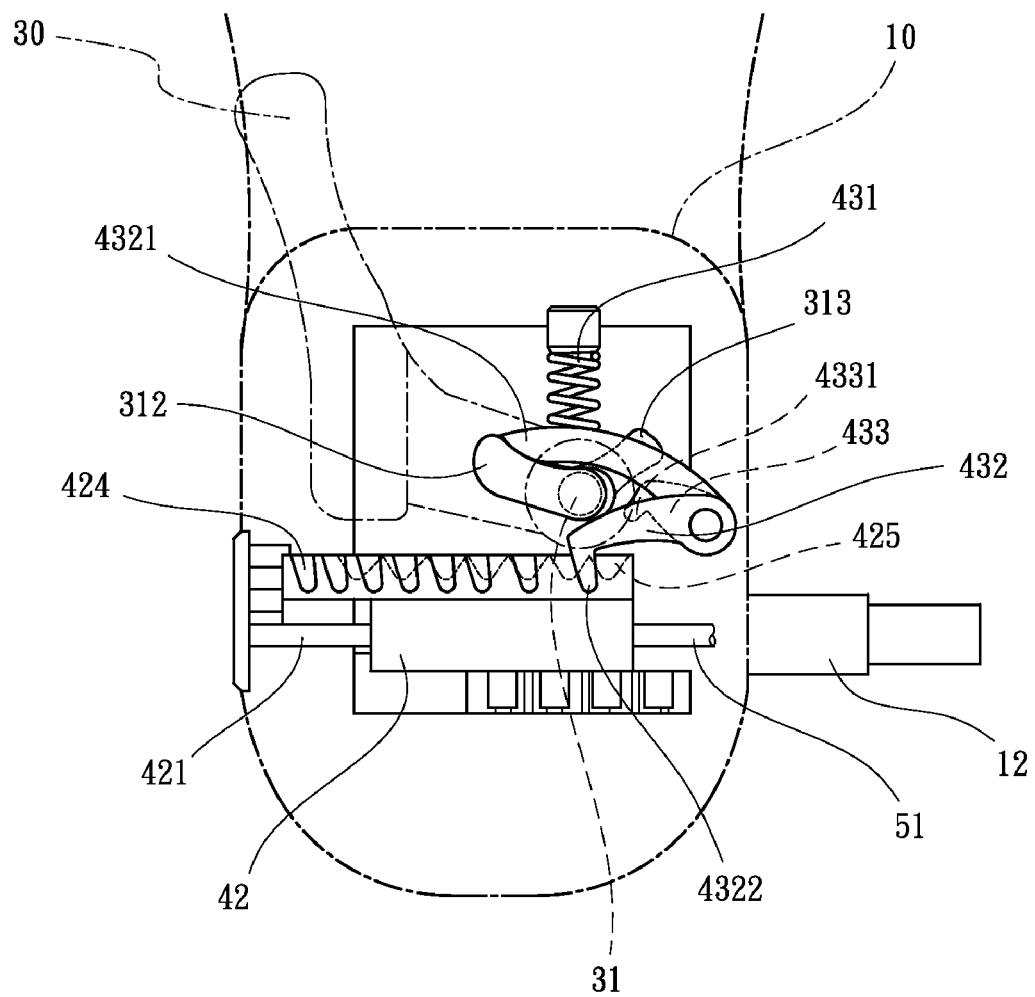
FIG. 9 shows that the driving pawl unit is not operated when the rod is not yet rotated.
Figure 10:
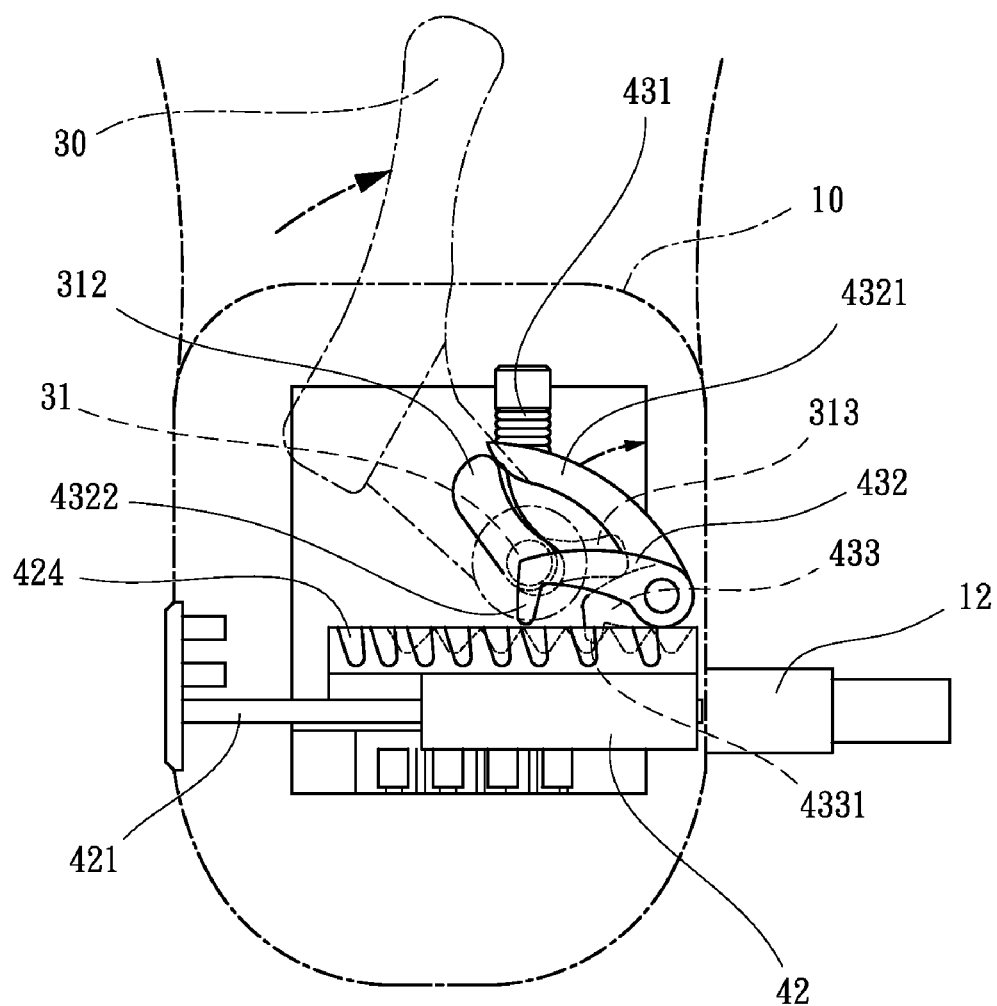
FIG. 10 shows that the rod is rotated, and the driving pawl unit is rotated by the rotation of the rod.
Figure 11:
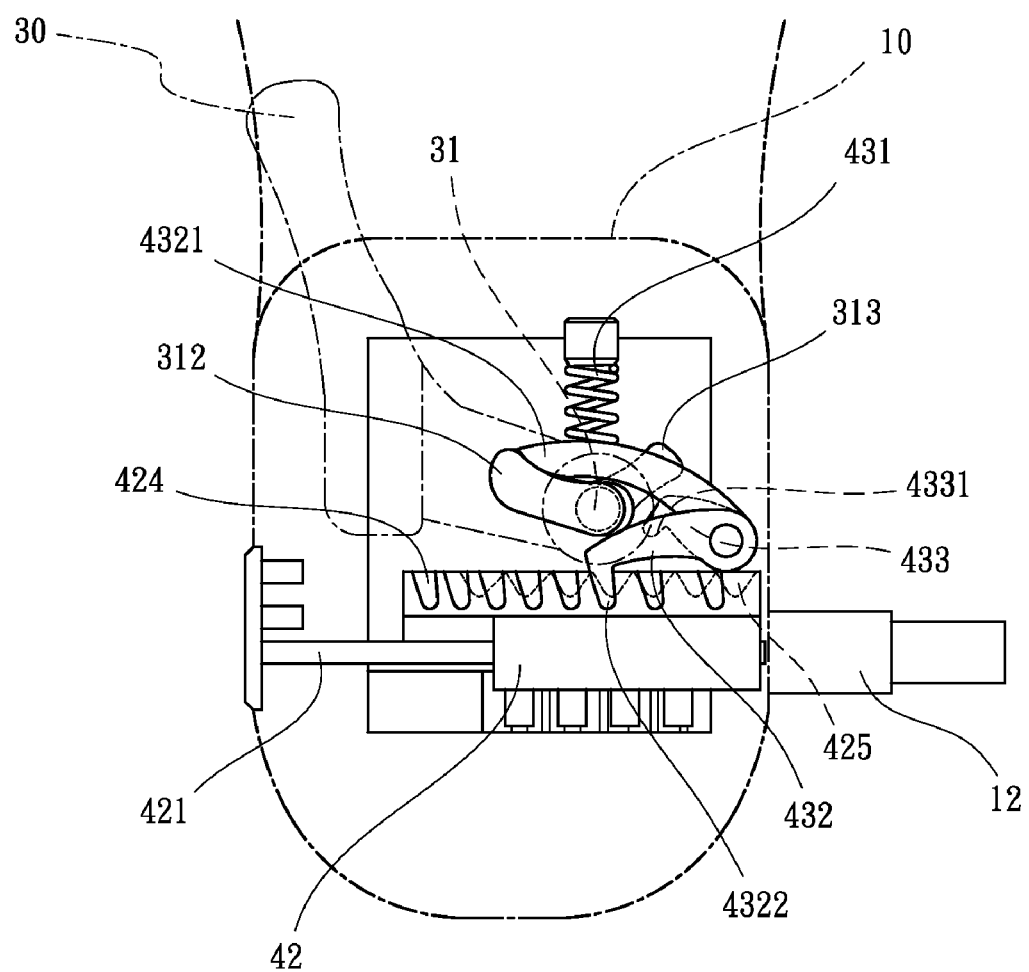
FIG. 11 shows that the driving pawl unit returns to its original position when the rider releases the protrusion on the rod.

As shown in FIGS. 9-11, when the button is not yet pressed, the first pawl 432 is engaged with the first engaging recess 424, and the rack 42 is held at its current position as shown in FIG. 9. When the button 30 is pushed, the rod 31 rotates an angle and the first block 312 pushes the first piece 4321, and the hooked piece 4322 is disengaged from the first engaging recess 424. In the meanwhile, the second block 313 pushes the driving member 433 whose hooked end 4331 is moved toward the second engaging recess 425 to push the rack 42 toward the other direction os that the derailleur cable 51 is loosened.

As shown in FIG. 11, when the button 30 is released, the second torsion spring 311 returns the rod 31 to its original position, and the driving pawl unit 43 is pivoted by the biasing member 431 to the position as shown in FIG. 9. The rack 42 does not move when the driving member 433 are removed from the second engaging recess 425. The derailleur cable 51 is maintained its tension.

While we have shown and described the embodiment in accordance with the present invention, it should be clear to those skilled in the art that further embodiments may be made without departing from the scope of the present invention.

What is claimed is:

1. A combination of derailleur shifter and brake lever for bicycles, comprising:
    a base adapted to be connected to a bicycle handlebar and an end member is pivotably connected to a distal end of the base;
    a lever having a first end pivotably connected to the end member by a pivot and a toothed portion defined in the first end of the lever;
    a rod connected to the lever and having a protrusion which is located close to a second end of the lever, a first block and a second block extending radially from the rod, an angle defined between the first and second blocks;
    a driving unit located in the base and having a driving plate, a rack and a driving pawl unit, the driving plate movably connected to a first guide rod and a plurality of teeth extending from on a side of the driving plate, the toothed portion engaged with the teeth, two positioning members pivotably connected to the other side of the driving plate and each positioning member having an inclined engaging end, the rack movably connected to a second guide rod and having a plurality of notches with which the inclined engaging ends of the positioning members are removably engaged, the second guide rod located at a first end of the rack, the rack further having a plurality of first engaging recesses and second engaging recesses, a derailleur cable having a first end fixed to the rack, and the driving pawl unit having a first pawl and a driving member, the first pawl including a first piece and a hooked piece which has one end fixed with one end of the first piece, the hooked piece removably engaged with first recesses, the driving member having a hooked end which is removably engaged with the second engaging recesses, the first block on the rod located in contact with a first side of the first piece and the second block located in contact with the first pawl.

2. The combination as claimed in claim 1, wherein a fixing recess is defined in a second end of the rack and the first end of the derailleur cable is fixedly engaged with the fixing recess.

3. The combination as claimed in claim 1, wherein a pin extends through the first pawl and the driving member.

4. The combination as claimed in claim 1, wherein the pivot has a first torsion spring mounted thereto.

5. The combination as claimed in claim 1, wherein the rod has a second torsion spring mounted thereto.

6. The combination as claimed in claim 1, wherein a biasing member is located between an inside of the base and a second side of the first piece.

7. The combination as claimed in claim 1, wherein a tube extends from the base and the second end of the derailleur cable extends through the tube.

* * * * *